C. A. HEINZELMAN.
ROLLER BEARING.
APPLICATION FILED NOV. 6, 1911.
1,030,401.
Patented June 25, 1912.
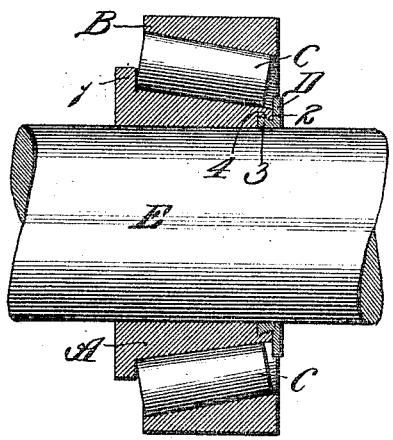
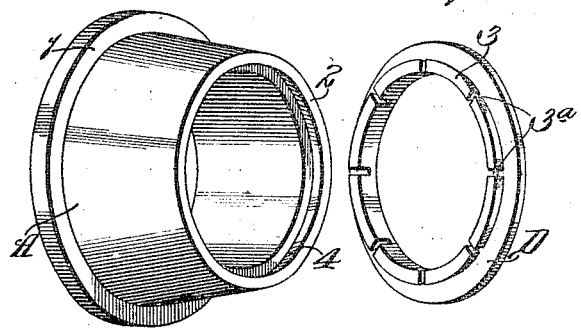
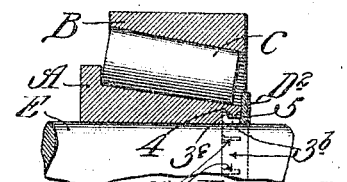
Inventor
C. A. Heinzelman.
By Paul Bakewell Atty.

UNITED STATES PATENT OFFICE.

CHESTER ARTHUR HEINZELMAN, OF BELLEVILLE, ILLINOIS.

ROLLER-BEARING.

1,030,401.

Specification of Letters Patent.   Patented June 25, 1912.

Application filed November 6, 1911. Serial No. 658,793.

*To all whom it may concern:*

Be it known that I, CHESTER A. HEINZELMAN, a citizen of the United States, residing at Belleville, Illinois, have invented a certain new and useful Improvement in Roller-Bearings, of which the following is a full, clear, and exact description, such as will enable others skilled in the art to which it appertains to make and use the same.

This invention relates to roller bearings. One object of my invention is to provide a roller bearing of novel construction in which the inner member of the bearing on which the rollers travel is provided with a removable roller-retaining device that is locked on said inner member by the shaft or spindle on which the inner member is mounted.

Another object is to provide a roller bearing of the character described which is so designed that the roller-retaining device on the inner member can be applied and removed easily.

Figure 1 of the drawings is a sectional view of a roller bearing constructed in accordance with my invention; Fig. 2 is a perspective view of the inner member of the bearing; Fig. 2ᵃ is a perspective view of one form of roller-retaining device that can be used with said inner member; Fig. 3 is a sectional view of another form of my invention.

Referring to the drawings which illustrate my invention, A designates the inner member of the bearing which is preferably cone-shaped, B designates the outer member whose inner surface is of the same taper as the outer surface of the cone A, and C designates the rollers which are arranged between said inner and outer members. The inner member A is provided at one end with a flange 1 that prevents the rollers from moving longitudinally of the inner member in one direction, and a removable roller-retaining device D is arranged at the opposite end of said inner member for preventing the rollers from moving longitudinally in the opposite direction.

The roller-retaining device D shown in Figs. 1 and 2ᵃ consists of a ring that bears against the end face 2 of the inner cone A and projects outwardly beyond the outer surface of the cone A on which the rollers travel, thus forming a flange which prevents the rollers from moving longitudinally of the inner cone. Said ring D is provided at one side with a laterally projecting flange 3 that fits in an annular groove 4 formed in the end portion of the inner cone A, as shown in Fig. 2. The flange 3 increases gradually in thickness toward the outer edge of same, as shown in Fig. 1, so that the outer surface of same will be tapered with relation to the inner surface of the flange. The annular recess 4 in the cone A is also tapered so that the side walls of same will conform approximately to the shape of the flange 3 on the ring D. The flange 3 is provided with a plurality of slots 3ᵃ, as shown in Fig. 2ᵃ, that divide the flange into segmental-shaped sections or fingers which can be bent inwardly toward the longitudinal axis of the bearing and thus permit the tapered flange 3 on the ring D to be forced into the tapered or undercut recess 4 in the inner cone A of the bearing. After the flange 3 has been forced into the recess 4 in the inner cone A said flange is expanded or bent outwardly so that it will fill said recess and snugly embrace the tapered side walls of same. The shaft or spindle E, with which the bearing is used, passes through the inner cone A and through the ring D and thus securely locks said ring D in operative position, it being impossible for the flange 3 on said ring to spring out of the undercut recess in the cone A when the bearing is mounted on the spindle E, as shown in Fig. 1.

A roller bearing of the construction above described is efficient, inexpensive to manufacture, and easy to assemble or disassemble, and when it is arranged in operative position on the spindle or shaft it is impossible for the roller-retaining device D to become accidentally detached from the inner cone A because said device has a tapered portion or flange that is held securely in an undercut recess in the inner cone by means of the spindle on which the bearing is mounted.

In Fig. 3 I have illustrated another form of my invention wherein the ring D² is formed from pressed metal and provided with a plurality of inwardly projecting fingers 3ᵇ that have lugs or projections 3ᶜ at their inner ends which engage the wall of the undercut recess 4 in the cone A and thus lock the ring in operative position. In order that the ring D² may be arranged in position easily I have provided the cone A with a beveled surface 5 which tapers oppositely to the side walls of the annular recess 4 in the end of the cone, as shown in Fig. 3. When the ring D² is applied to the end of the cone A and forced inwardly, or to the left, looking at Fig. 3, the beveled surface 5 against which the lugs 3ᶜ on the fingers of the ring bear, causes said fingers to yield or move inwardly slightly toward the center of the ring. After said lugs have passed over the inclined surface 5 on the cone the fingers on the ring spring outwardly and thus force the lugs 3ᶜ into the undercut recess 4 in the cone A.

Having thus described my invention, what I claim as new and desire to secure by Letters Patent is:

1. A roller bearing comprising an inner member on which the rollers travel and provided at one end with a flange for preventing longitudinal movement of the rollers, and a removable roller-retaining device arranged adjacent the opposite end of said member and provided with fingers that lie between said inner member and the spindle of the bearing, said fingers being so shaped that said device cannot be removed when the spindle is arranged in operative position.

2. A roller bearing comprising an inner member mounted on the spindle of the bearing and provided at one end with an undercut recess and a beveled surface which tapers oppositely to the sides of said recess, and a roller-retaining ring provided with yielding fingers which have lugs that project into said undercut recess.

In testimony whereof I hereunto affix my signature in the presence of two witnesses, this thirteenth day of October, 1911.

CHESTER ARTHUR HEINZELMAN.

Witnesses:
WELLS L. CHURCH,
GEORGE BAKEWELL.